United States Patent
Schmidt (10) Patent No.: US 11,878,790 B2
(45) Date of Patent: Jan. 23, 2024

(54) NOSE WHEEL STEERING FEEDBACK SYSTEM

(71) Applicant: Safran Landing Systems Canada Inc., Ajax (CA)

(72) Inventor: Robert Kyle Schmidt, Brooklin (CA)

(73) Assignee: Safran Landing Systems Canada Inc., Ajax (CA)

( * ) Notice: Subject to any disclaimer, the term of this patent is extended or adjusted under 35 U.S.C. 154(b) by 17 days.

(21) Appl. No.: 17/695,279

(22) Filed: Mar. 15, 2022

(65) Prior Publication Data

US 2023/0294823 A1 Sep. 21, 2023

(51) Int. Cl.
*B64C 25/50* (2006.01)
*B62D 6/00* (2006.01)

(52) U.S. Cl.
CPC .............. *B64C 25/50* (2013.01); *B62D 6/008* (2013.01)

(58) Field of Classification Search
CPC .............................. B64C 25/50; B64C 25/505
See application file for complete search history.

(56) References Cited

U.S. PATENT DOCUMENTS

| 9,139,295 | B2 | 9/2015 | Benmoussa | |
|---|---|---|---|---|
| 2011/0147514 | A1* | 6/2011 | Straub | B64C 25/50 244/50 |
| 2017/0074660 | A1* | 3/2017 | Gann | B64D 43/00 |

* cited by examiner

*Primary Examiner* — Christopher D Hutchens
(74) *Attorney, Agent, or Firm* — CHRISTENSEN O'CONNOR JOHNSON KINDNESS PLLC (57) ABSTRACT

A feedback system senses a steering position of a nose wheel assembly for an aircraft. The nose wheel assembly has a first element rotatably associated with a second element about an axis, and the rotational position of the first element relative to the second element corresponds to the steering position of the nose wheel assembly. The feedback system includes a first magnetic field sensor fixedly positioned relative to the first element and configured to sense a first element orientation. A second magnetic field sensor is fixedly positioned relative to the second element and configured to sense a second element orientation. The feedback system further includes a controller programmed to determine the steering position of the nose wheel according to the sensed first element orientation and the sensed second element orientation.

16 Claims, 5 Drawing Sheets

NOSE WHEEL STEERING FEEDBACK SYSTEM

BACKGROUND

The landing gear for modern aircraft commonly include a steerable nose wheel assembly with one or more wheels. The angular position, i.e., the steering angle, of the nose wheels is controllable from the flight deck to enable the pilot to steer the aircraft during taxiing and other low-speed ground maneuvers.

Modern nose wheel steering systems are "steer by wire" system for which the steering system is commanded electronically. These systems include a control loop that is closed between the pilot steering demand and the sensed angular position of the nose wheels. For such systems, it is critical that the steering orientation feedback sensor be robust and reliable. An incorrect indication of nose wheel position can lead to an aircraft departing the runway or taxiway, while other failure modes can lead to the inability to use the steering and the aircraft, resulting in lost revenue.

Figure 1:
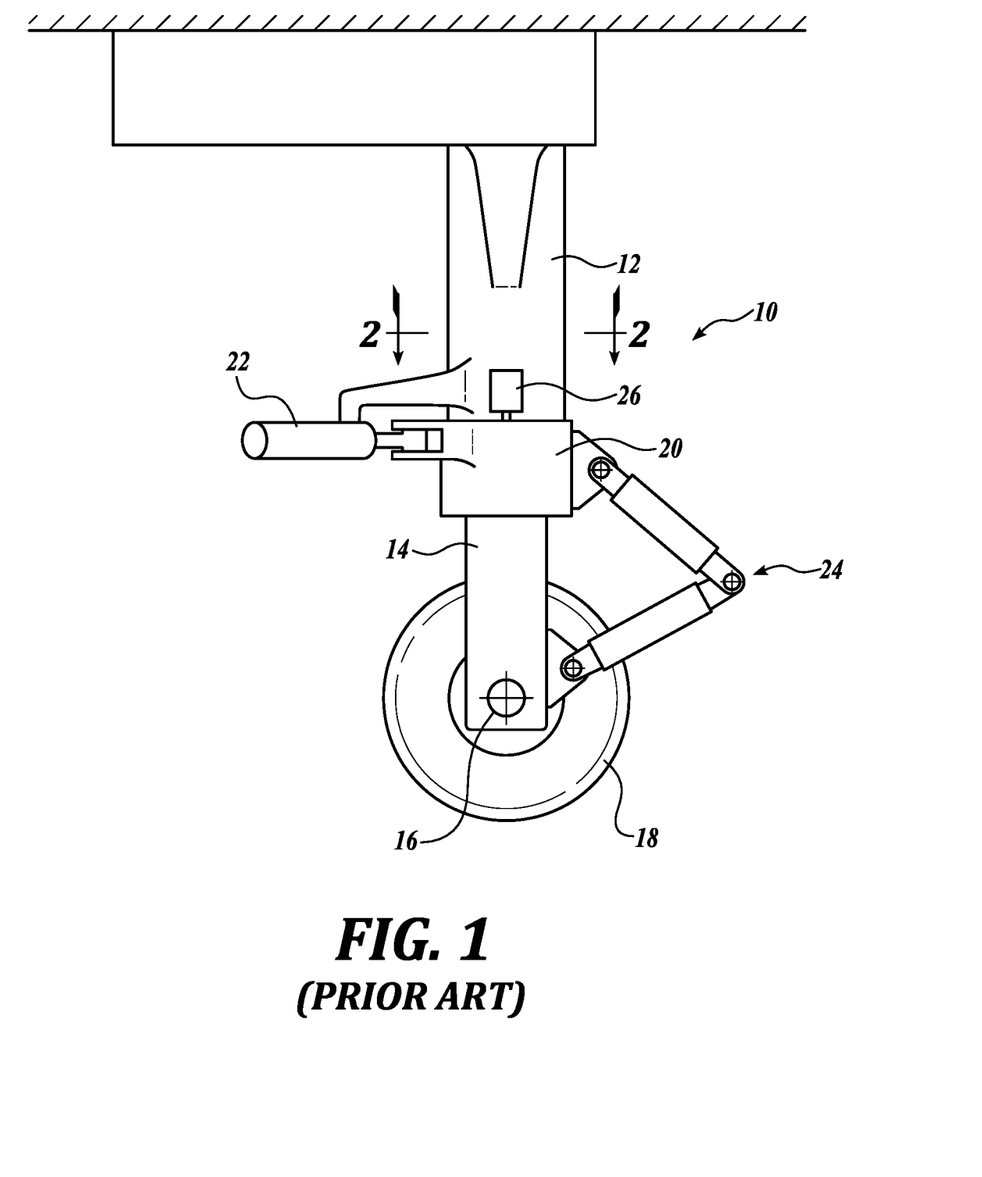
FIG. 1 shows a side view of a known nose wheel steering feedback system.
Figure 2:
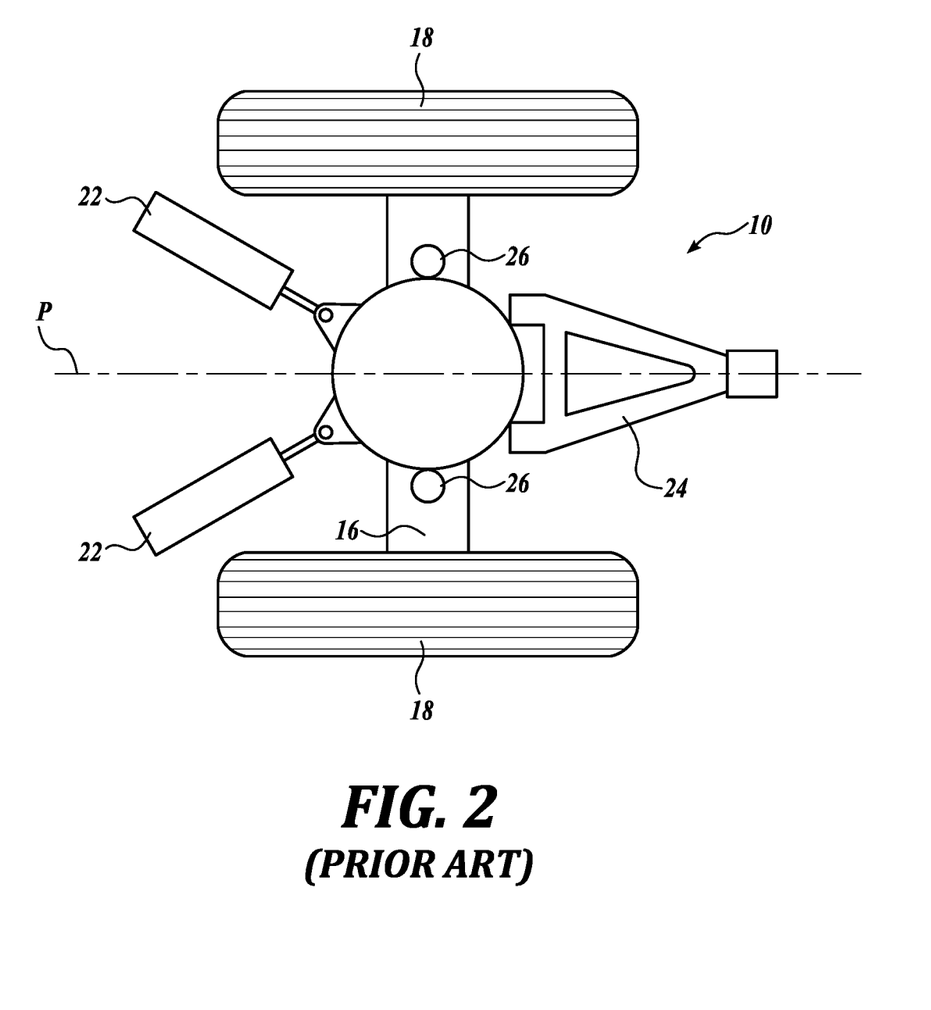
FIG. 2 shows a plan view thereof.

An example of a known system for sensing the orientation of a steerable aircraft nose wheel is disclosed in U.S. Pat. No. 9,139,295, titled "Method of Controlling the Steering of a Steerable Portion of an Aircraft Undercarriage," currently assigned to Safran Landing Systems, the disclosure of which is incorporated in its entirety herein. As shown in FIGS. 1 and 2, the nose wheel assembly 10 includes a main fitting 12 mounted to the structure of the aircraft. A brace member (not shown) extends between the structure of the aircraft and the strut in order to stabilize the main fitting 12, and thus the undercarriage, in its deployed position, as shown.

A sliding tube 14 slides in the main fitting 12, and an axle 16 with rotatable wheels 18 mounted thereto is coupled to the bottom end of the sliding tube. A turning tube 20 is mounted to turn on the bottom portion of the main fitting 12 to enable the turning tube to be steered in a controlled manner by a steering member, constituted in this example by actuators 22 mounted in push-pull. The turning tube 20 and the sliding tube 14 are constrained to turn together by a torque link 24 such that steering the turning tube 20 causes the sliding tube 14 to be steered and thus also the wheel 18.

Angular position sensors 26 are arranged on the main fitting 12 to measure the angular position of the turning tube 20 and, thus, of the wheel 18 relative to the main fitting 12. The angular position sensors 26 deliver annular position signals that are used by a steering computer arranged in the aircraft to control the steering of the wheels 18 in response to a steering order generated by the pilot, by pressing on pedals or by turning a steering wheel.

Many current steering systems used rotary variable differential transformers (RVDTs) or their linear analog counterparts, linear variable differential transformers (LVDTs). These devices offer high reliability as the measurement is made without requiring contact between the movable element and the stationary element (unlike a rotary potentiometer, for example, which requires intimate contact between a 'wiper' and a conductive 'track'). The avoidance of contact reduces concerns with wear-out failure modes, and the RVDT is, in general, a robust sensor.

However, RVDTs and LVDTs have limited measuring ranges and also must be coupled mechanically to both the stationary and moving parts of the landing gear. These coupling solutions often involve gears or linkages, which introduce additional components and potential failure modes to the system. Additionally, the mechanical connections introduce wear-out modes of their own as play and slop increase with time.

Magnetic field sensors, e.g., magnetometers, are passive sensors that are sensitive to the earth's magnetic field. Because of this sensitivity, it is known to configure magnetometers to function as "electronic compasses" to be used for navigation. U.S. Pat. No. 6,860,023 ("the '023 patent"), titled "Methods and Apparatus for Automatic Magnetic Compensation" and issued to Manfred et al. discloses the use of magnetometers for direction indication. The '023 patent, the disclosure of which is incorporated in its entirety herein, further discloses methods and apparatus for compensating for local magnetic field disturbances caused by nearby magnetic objects, for example, ferrous materials, and magnetic fields generated by electrical currents. However, the use of a magnetometer in the manner disclosed in the '023 patent would not likely be precise enough to be used as a landing gear steering sensor, even when compensating for variation in magnetic declination and local magnetic field disturbances.

SUMMARY

Embodiments of a feedback system for sensing a steering position of a nose wheel assembly for an aircraft are set forth below according to technologies and methodologies of the present disclosure. The feedback systems utilizes a pair of magnetic field sensors to determine the orientation of fixed and rotating components relative to the earth's magnetic field. Because the magnetic field sensors are in close proximity to each other, they both sense the same portion of the earth's magnetic field and are both subject to the same local magnetic field distortions. Any errors in the detected orientation cancel out when the orientations of the magnetic field sensors are compared to determine the steering position of the nose wheel assembly.

A first embodiment of feedback system is included on an aircraft having a steerable nose wheel assembly. The nose wheel assembly has a first element rotatably associated with a second element about an axis, and the rotational position of the first element relative to the second element corresponds to the steering position of the nose wheel assembly. The feedback system includes a first magnetic field sensor fixedly positioned relative to the first element and is configured to sense a first element orientation. A second magnetic field sensor is fixedly positioned relative to the second element and is configured to sense a second element orientation. The feedback system further includes a controller (e.g., control circuit, etc.) configured to (e.g., specifically programmed to, etc.) determine the steering position of the nose wheel according to the sensed first element orientation and the sensed second element orientation.

In any embodiment, the nose wheel assembly comprises a main fitting, the first magnetic field sensor being fixedly mounted to the main fitting.

In any embodiment, the nose wheel assembly comprises a turning tube, the second magnetic field sensor being fixedly mounted to the turning tube.

In any embodiment, the main fitting comprises a housing defining an interior cavity, wherein the first and second magnetic field sensors are located in the cavity.

In any embodiment, the first magnetic field sensor is mounted to the housing.

In any embodiment, the first magnetic field sensor is configured to sense an angle $\theta_f$ between a first magnetic field sensor frame of reference and a first sensed magnetic field direction.

In any embodiment, the first sensed magnetic field is a direction of the magnetic field of the earth.

In any embodiment, the second magnetic field sensor is configured to sense an angle $\theta_r$ between a second magnetic field sensor frame of reference and a second sensed magnetic field direction.

In any embodiment, the second sensed magnetic field is a direction of the magnetic field of the earth.

In any embodiment, the steering position of a nose wheel assembly is defined by an angle $\theta$, wherein $\theta=\theta_r-\theta_f$.

In any embodiment, the first and second magnetic field sensors are 2d magnetic field sensors.

In any embodiment, the first and second magnetic field sensors are 3d magnetic field sensors.

In any embodiment, the first and second magnetic field sensors each comprises a rate gyroscope.

In any embodiment, a Kalman Filter may be included to combine a magnetometer reading with a rate gyroscope reading to determine an orientation.

According to another aspect of the present disclosure, a nose wheel assembly for an aircraft includes a feedback system that senses a steering position of a nose wheel assembly for an aircraft. The feedback system includes a first magnetic field sensor fixedly positioned relative to a first element and is configured to sense a first element orientation. A second magnetic field sensor is fixedly positioned relative to a second element and is configured to sense a second element orientation. The feedback system further includes a controller (e.g., control circuit, etc.) configured to (e.g., specifically programmed to, etc.) determine the steering position of the nose wheel according to the sensed first element orientation and the sensed second element orientation.

In any embodiment, the first element is a main fitting, and the second element is a turning tube at least partially disposed within the main fitting, the second element being rotatable relative to the main fitting about an axis.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this disclosed subject matter will become more readily appreciated as the same become better understood by reference to the following detailed description, when taken in conjunction with the accompanying drawings, wherein.

DETAILED DESCRIPTION

Disclosed embodiments of a feedback system utilize magnetometers to determine the angular position of a nose gear relative to an aircraft, i.e., the steering angle of the nose gear. To accomplish this, various feedback systems include first and second magnetometers mounted in close proximity to each other, wherein the first magnetometer is fixedly positioned relative to the fixed structure of the aircraft, and the second magnetometer is mounted to rotate with the nose gear. Both magnetometers sense the earth's magnetic field. Because of the close proximity of the magnetometers, the orientation of the magnetometers relative to each other and, thus, the steering angle of the nose gear can be determined in a way that is unaffected by the geographic location of the magnetometers and local distortions in the earth's magnetic field.

Figure 3:
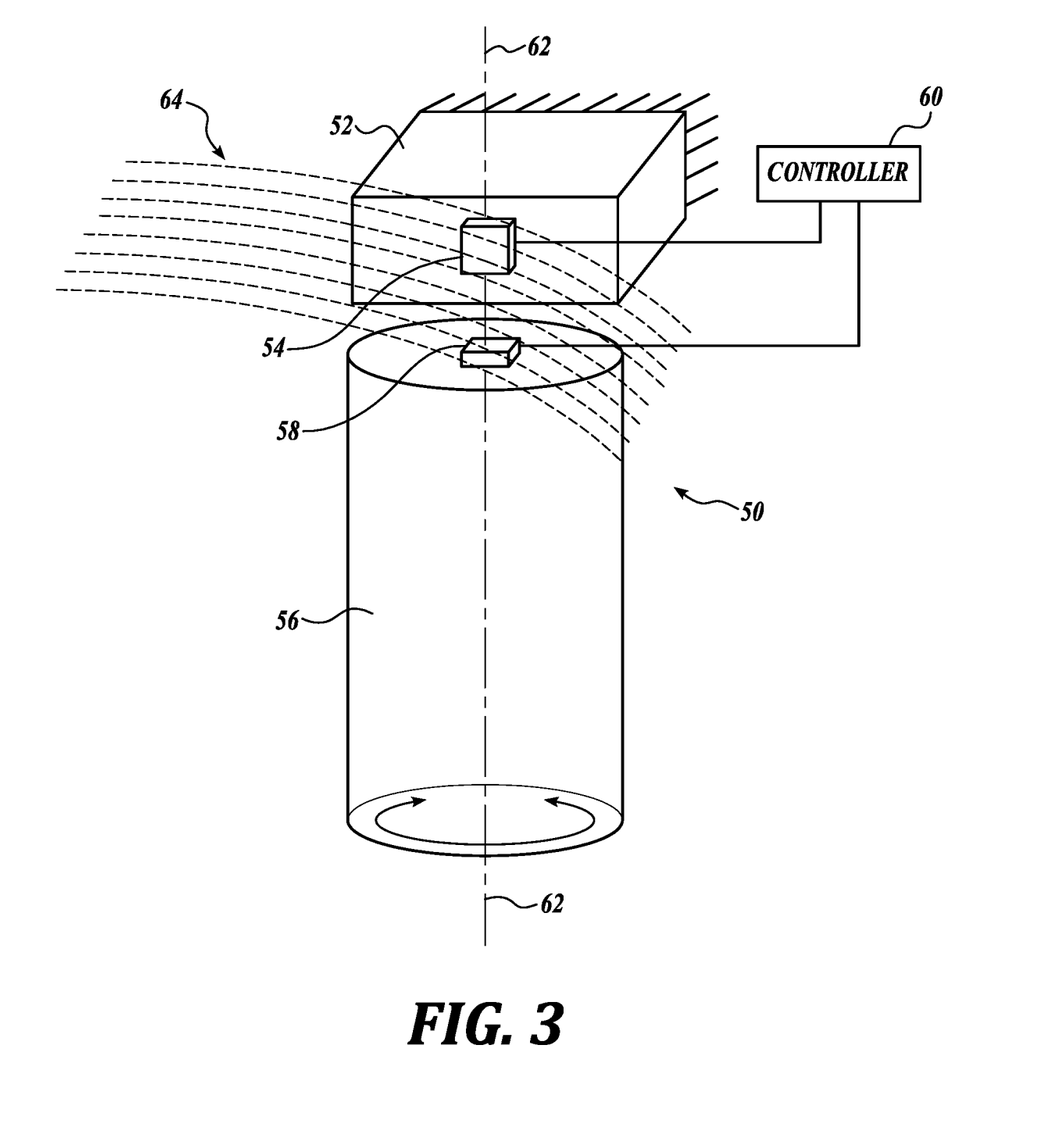
FIG. 3 shows a schematic view of a representative nose wheel steering feedback system according to aspects of the present disclosure.

FIG. 3 shows a schematic view of representative embodiment of a feedback system 50 according to aspects of the present disclosure. The feedback system 50 is suitable for determining an angular position of a first element 52 relative to a second element 56. In the illustrated embodiment, the second element 56 is rotatable about an axis 62 relative to the first element 52. A first magnetometer 54 is fixedly associated with the first element 52, and a second magnetometer 58 is fixedly associated with the second element 56. Accordingly, as the second element 56 rotates about axis 62 relative to the first element 52, the second magnetometer 58 rotates about axis 62 relative to the first magnetometer 52. That is, a change in the angular position of the second element 56 relative to the first element 52 results in a corresponding change in the angular position of the second magnetometer 58 relative to the first magnetometer 54.

The first magnetometer 54 and second magnetometer 58 are both in operable communication with a controller 60. Each magnetometer senses the direction of the earth's magnetic field 64 relative to its own frame of reference to determine the orientation of the magnetometer relative to the earth. The magnetometers send signals corresponding to the sensed orientation to the controller 60. In some embodiments, one or both magnetometers are 2d magnetometers. In some embodiments, one or both magnetometers are 3d magnetometers.

The controller 60 compares the sensed direction of the earth's magnetic field from the first and second magnetometers 54 and 58. Because the magnetometers are in close proximity, the direction of the earth's magnetic field being sensed is the same, i.e., the any differences in the directions of the magnetic field relative the earth will be negligible. Accordingly, any difference in the sensed directions will correspond to a difference between the respective orientations of the frames of reference of the first and second magnetometers 54 and 58. In some embodiments, the distance between the magnetometers is less than 20 inches, less that 10 inches, or less than 1 inch.

The close proximity of the first magnetometer 54 and second magnetometer 58 also means that the magnetometers are exposed to the same local magnetic field distortions caused by, for example, nearby magnetic objects, such as ferrous materials, and magnetic fields generated by electrical currents. The proximity of the first magnetometer 54 and second magnetometer 58 also means that variations in the earth's magnetic field at different geographic locations will not affect the accuracy of the system. To the extent that the sensed orientation of the first magnetometer 54 is affected by local distortions and geographic location, the second magnetometer 58 is affected by those same local distortions and variations due to geographic location. When the controller compares the sensed orientations of magnetometers, i.e., determines the angular position of the first element 52 relative to the second element 56 according to the difference between the two sensed orientations, any distortions in the sensed orientations will be present for both magnetometers. Because the distortions affect both sensed orientations equally, the distortions cancel out when the angular difference between the two orientations is determined.

In some embodiments, the controller 60 is a discrete controller. In some embodiments, the described functions of the controller 60 are performed by one or more other control units, controllers, the FADEC, etc., of the vehicle. In some embodiments, the discrete controller and/or the one or more other control units comprise hardware circuitry (e.g., analog and/or digital circuits, etc.) for carrying out its functionality described herein. In other embodiments, the controller or the various control units include, for example, a processor and memory. The memory may include computer readable storage media in read-only memory (ROM), random-access memory (RAM), and keep-alive memory (KAM), for example. The KAM may be used to store various operating variables or program instructions while the processor is powered down. The program instructions, when executed by the processor, is configured to carry out the functionality of the controller 60 described above. In that regard, the processor and/or memory storing the program instructions forms a special purpose controller or control circuit specifically configured to carry out the methodologies and technologies described herein.

The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, instructions, programs, modules, etc.

As used herein, the term processor is not limited to integrated circuits referred to in the art as a computer, but broadly refers to a microcontroller, a microcomputer, a microprocessor, a programmable logic controller, an application specific integrated circuit, other programmable circuits, combinations of the above, among others. Therefore, as used herein, the term "processor" can be used to generally describe these aforementioned components, and can be either hardware or software, or combinations thereof, that implement logic for carrying out various aspects of the present disclosure. Similarly, the terms "module" and "unit" can include logic that may be implemented in either hardware or software, or combinations thereof.

Figure 4:
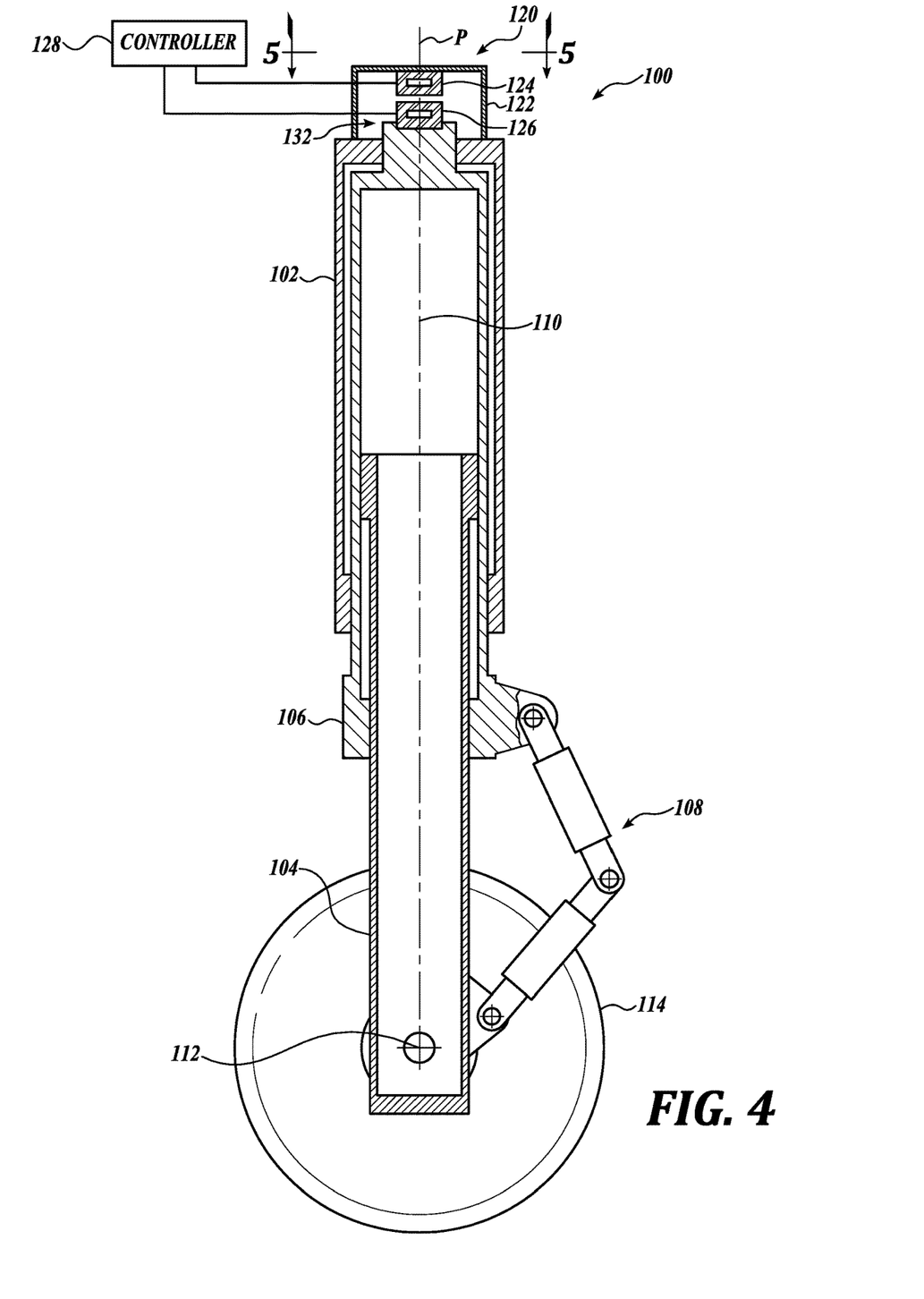
FIG. 4 shows a cross-sectional side view of a representative embodiment of a nose wheel steering feedback system according to aspects of the present disclosure.
Figure 5:
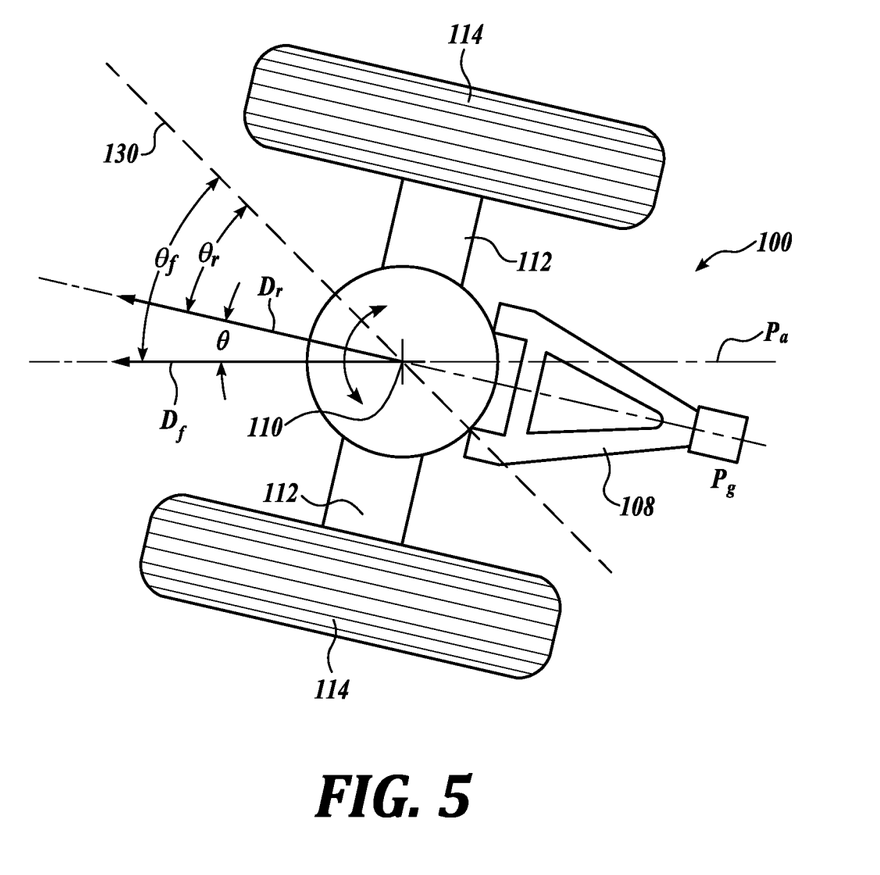
FIG. 5 shows a plan view thereof.

FIGS. 4 and 5 show a representative embodiment of a steerable nose wheel assembly 100 with a feedback system 120 similar to the feedback system 50 shown in FIG. 3. The nose wheel assembly 100 includes a generally cylindrical main fitting 102 coupled to the aircraft and extending in a downward direction. A turning tube 106 is disposed within the main fitting 102 and is configured for rotation about a longitudinal axis 110 of the nose wheel assembly 100. A sliding tube 104 is slidingly disposed within the turning tube 106 and is configured for reciprocating translation along the longitudinal axis 110 of the nose wheel assembly 100. A bottom end of the sliding tube 104 is coupled to an axle 112 with one or more wheels 114 rotatably mounted thereto.

The nose wheel assembly 100 further includes a torque link 108 that fixes the axle 112 and wheels 114 in rotation about axis 110 relative to the turning tube 106. Thus, when the turning tube 106 is rotated about axis 110 by one or more actuators (not shown), the turning tube, axle 112, and wheels 114 rotate in unison about axis 110 relative to the main fitting 102 to steer the aircraft.

The nose wheel assembly 100 further includes a feedback system 120 that determines the steering position of the nose wheel assembly. The feedback system 120 has a first magnetometer 124 fixedly positioned relative to the main fitting 102. A second magnetometer 126 is fixedly positioned relative to the turning tube 106 so the second magnetometer rotates with the turning tube about axis 110. As the turning tube 106, axle 112, and wheels 114 rotate about axis 110 to steer the aircraft, the second magnetometer 126 rotates relative to the first magnetometer 124 by a corresponding amount.

In the illustrated embodiment, the nose wheel assembly 100 includes a housing 122 fixedly coupled to the main fitting 102 and defining an interior cavity 132. The first magnetometer 124 and second magnetometer 126 are disposed within the housing 122, and the first magnetometer is mounted to the housing to maintain a fixed position relative to the main fitting 102. In some embodiments, the housing 122 is made from a non-ferrous material so that the housing does not interfere with the ability of the magnetometers to sense the earth's magnetic field.

Referring now to FIG. 5, a plan view of the nose wheel assembly 100 of FIG. 4 is shown. In the illustrated embodiment, the first magnetometer 124 measures the angle $\theta_f$ between the local magnetic field direction 130 and the directional frame of reference $D_f$ of the first (fixed) magnetometer 124. That is, the first magnetometer 124 senses the orientation of the first magnetometer and the associated structure. Similarly, the second magnetometer 126 measures the angle $\theta_r$ between the local magnetic field direction 130 and the directional frame of reference $D_r$ of the second (rotating) magnetometer 126. The controller 128 calculates the steering angle $\theta$ of the nose wheel assembly, i.e., the angle between the nose wheel plane of symmetry $P_g$ and the aircraft plane of symmetry $P_a$, according to the following equation:

$$\theta = \theta_f - \theta_r \qquad \text{Equation (1)}$$

In this manner, the feedback system 120 determines the steering angle of the nose wheel assembly 100 by comparing a sensed orientation of the rotating components, e.g., turning tube, axle, wheels, etc., relative to the fixed components, e.g., main fitting. Because of the close proximity of the magnetometers, the calculated steering angle is unaffected by geographic location within the earth's magnetic field and distortions of the local magnetic field.

In the illustrated embodiments, the directional frame of reference $D_f$ of the first (fixed) magnetometer 124 is aligned with the aircraft plane of symmetry $P_a$, and the directional frame of reference $D_r$ of the second (rotating) magnetometer 126 is aligned with the nose wheel assembly plane of symmetry $P_g$. It will be appreciated, however, that in some embodiments, the directional frame of reference for each magnetometer has any relationship to the structure to which the magnetometer is mounted, and the controller can be calibrated to account for such differences. Further, the magnetometers can be mounted to any structure that has a known positional relationship to the main fitting or the wheels of the nose wheel assembly. In some embodiments, any suitable magnetic field sensors are used.

In some embodiments, the first magnetometer 124 is fixedly positioned with respect to any structure that maintains a fixed position relative to the fuselage of the aircraft, and the second magnetometer 126 maintains a fixed position relative to any structure that moves or rotates with the nose wheel assembly, such as, for example, actuators. In some embodiments, the first magnetometer 124 and the second magnetometer 126 are mounted to any suitable structure for which a change in rotational position of the respective mounting structures corresponds to a change in the rotational position of the nose landing gear assembly. In some embodiments, the first magnetometer 124 does not maintain a fixed position relative to the fuselage of the aircraft, however, the position of the first magnetometer relative to the second magnetometer 126 corresponds to the position of the nose landing gear assembly. In some embodiments, the first magnetometer 124 does not maintain a fixed position relative to the fuselage of the aircraft, however, rotation of the first magnetometer relative to the second magnetometer 126 corresponds to rotation of the nose landing gear assembly. These and other suitable mounting structures for which the position and/or movement of the first and second magnetometers 124, 126 corresponds to the position and/or rotation of the nose landing gear assembly are contemplated and should be considered within the scope of the present disclosure.

In some embodiments, each magnetometer is a microelectromechanical (MEMS) sensor that also includes a rate gyroscope. These sensors, which are known in the art, provide a measurement of turning rate (angular rotation per second). In some embodiments, each rate gyroscope is mounted to measure turning rate about a vertical axis. That is, the rate measurement axis is vertical so that the rate gyroscope senses steering/yawing of the aircraft and landing gear.

In some embodiments, Kalman filtering is used to combine turning rate of the rate gyroscope and magnetometer readings to provide a stable and precise heading. The rate gyroscope is sensitive to rapid changes, however, small errors in measurement accumulate when the output is integrated over time to provide a heading. In contrast, magnetometers provide stable long-term measurements but may not be capable of particularly rapid sensing. Kalmann filtering/combination of the signals output by two sensor types is known in the art to provide a low-error, high-rate signal. In some embodiments, the combined, synthetic, heading values are used instead of the magnetometer output in order to provide an angular difference between the two adjacent sensor units.

In some embodiments, the rate gyroscope is used directly to check for any divergence (runaway) of the turning component, in which case the controller shuts down steering. The rate gyroscope provides a direct check on runaway and because it does not require any integrations, the readings are not subject to cumulative error. The rate gyroscope on the fixed portion of the nose gear assembly senses the yaw rate of the aircraft, while the rate gyroscope on the steering component senses the combine turning rate of the airplane and the nose wheel steering. Deducting the two measurements provides a direct indication of how quickly the nose wheel is steering. Conventional nose wheel steering systems (hydraulic powered) are controlled with a variable flow device (a servo valve) so a type of comparison between commanded rate and achieved rate can be achieved. In general, the achieved rate will be less than the commanded rate. However, an achieved rate greater than the commanded rate indicates a failure has occurred. When such a failure is determined, the controller comparison can disable the steering prior to the aircraft leaving the prepared surface of the airport.

Certain embodiments disclosed herein utilize circuitry (e.g., one or more circuits) in order to implement standards, protocols, methodologies or technologies disclosed herein, operably couple two or more components, generate information, process information, analyze information, filter signals, generate signals, encode/decode signals, convert signals, transmit and/or receive signals, control other devices, etc. Circuitry of any type can be used. It will be appreciated that the term "information" can be use synonymously with the term "signals" in this paragraph.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor that require software, firmware, and the like for operation. In an embodiment, circuitry includes one or more processors or portions thereof and accompanying software, firmware, hardware, and the like.

In some examples, the functionality described herein can be implemented by special purpose hardware-based computer systems or circuits, etc., or combinations of special purpose hardware and computer instructions.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known method/process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A feedback system for sensing a steering position of a nose wheel assembly for an aircraft, the nose wheel assembly having a first element rotatably associated with a second element about an axis, wherein a rotational position of the first element relative to the second element corresponds to the steering position of the nose wheel assembly, the feedback system comprising:
    a first magnetic field sensor fixedly positioned relative to the first element and configured to sense a first element orientation relative to the magnetic field of the earth and to transmit a first signal corresponding thereto;
    a second magnetic field sensor fixedly positioned relative to the second element and configured to sense a second element orientation relative to the magnetic field of the earth and to transmit a second signal corresponding thereto; and
    a controller programmed to determine the steering position of the nose wheel by comparing the first and second signals.

2. The feedback system of claim 1, wherein the nose wheel assembly comprises a main fitting, the first magnetic field sensor being fixedly mounted to the main fitting.

3. The feedback system of claim 2, wherein the nose wheel assembly comprises a turning tube, the second magnetic field sensor being fixedly mounted to the turning tube.

4. The feedback system of claim 2, wherein the main fitting comprises a housing defining an interior cavity, wherein the first and second magnetic field sensors are located in the cavity.

5. The feedback system of claim 4, wherein the first magnetic field sensor is mounted to the housing.

6. The feedback system of claim 1, wherein the first element orientation relative to the magnetic field of the earth is defined by an angle $\theta_f$ between a first magnetic field sensor frame of reference and the magnetic field of the earth.

7. The feedback system of claim 6 wherein the second element orientation relative to the magnetic field of the earth is defined by an angle $\theta_r$ between a second magnetic field sensor frame of reference and the magnetic field of the earth.

8. The feedback system of claim 1, wherein the first and second magnetic field sensors are selected from a group consisting of 2d magnetic field sensors and 3d magnetic field sensors.

9. A nose wheel assembly for an aircraft comprising the feedback system of claim 1.

10. A feedback system for sensing a steering position of a nose wheel assembly for an aircraft, the nose wheel assembly having a first element rotatably associated with a second element about an axis, wherein a rotational position of the first element relative to the second element corresponds to the steering position of the nose wheel assembly, the feedback system comprising:
    a first magnetic field sensor fixedly positioned relative to the first element and configured to sense a first element orientation;
    a second magnetic field sensor fixedly positioned relative to the second element and configured to sense a second element orientation; and
    a controller programmed to determine the steering position of the nose wheel according to the sensed first element orientation and the sensed second element orientation,
    wherein the first magnetic field sensor is configured to sense an angle $\theta_f$ between a first magnetic field sensor frame of reference and a first sensed magnetic field direction, the the magnetic field of the earth, and the second magnetic field sensor is configured to sense an angle $\theta_r$ between a second magnetic field sensor frame of reference and a second sensed magnetic field direction.

11. The feedback system of claim 10 wherein the second sensed magnetic field is a direction of the magnetic field of the earth.

12. The feedback system of claim 11, wherein steering position of a nose wheel assembly is defined by an angle $\theta$, wherein $\theta = \theta_r - \theta_f$.

13. A feedback system for sensing a steering position of a nose wheel assembly for an aircraft, the nose wheel assembly having a first element rotatably associated with a second element about an axis, wherein a rotational position of the first element relative to the second element corresponds to the steering position of the nose wheel assembly, the feedback system comprising:
    a first magnetic field sensor fixedly positioned relative to the first element and configured to sense a first element orientation;
    a second magnetic field sensor fixedly positioned relative to the second element and configured to sense a second element orientation; and
    a controller programmed to determine the steering position of the nose wheel according to the sensed first element orientation and the sensed second element orientation,
    wherein the first and second magnetic field sensors each comprises a rate gyroscope.

14. The feedback system of claim 13, wherein for at least one of the first and second magnet field sensors, a Kalman Filter combines a reading of the corresponding magnetometer with a reading of the corresponding rate gyroscope to determine an orientation of the at least one of the first and second magnetic field sensor.

15. The nose wheel assembly of claim 14, wherein the first element is a main fitting, and the second element is a turning tube at least partially disposed within the main fitting, the second element being rotatable relative to the main fitting about an axis.

16. The feedback system of claim 13, wherein the first and second magnetic field sensors are selected from a group consisting of 2d magnetic field sensors and 3d magnetic field sensors.

\* \* \* \* \*